United States Patent
Graglia

(10) Patent No.: US 9,566,942 B2
(45) Date of Patent: Feb. 14, 2017

(54) MECHANICAL STEERING LOCK FOR VEHICLES

(71) Applicant: TRW AUTOMOTIVE ITALIA S.R.L., Turin (IT)

(72) Inventor: Daniele Graglia, Santena (IT)

(73) Assignee: TRW AUTOMOTIVE ITALIA S.R.L., Turin (IT)

( * ) Notice: Subject to any disclaimer, the term of this patent is extended or adjusted under 35 U.S.C. 154(b) by 0 days.

(21) Appl. No.: 15/023,135

(22) PCT Filed: Sep. 23, 2014

(86) PCT No.: PCT/IB2014/064776
§ 371 (c)(1),
(2) Date: Mar. 18, 2016

(87) PCT Pub. No.: WO2015/040604
PCT Pub. Date: Mar. 26, 2015

(65) Prior Publication Data
US 2016/0236649 A1    Aug. 18, 2016

(30) Foreign Application Priority Data

Sep. 23, 2013 (IT) .............. TO2013A0766

(51) Int. Cl.
*B60R 25/02*     (2013.01)
*B60R 25/021*    (2013.01)

(52) U.S. Cl.
CPC ....... *B60R 25/021* (2013.01); *B60R 25/02128* (2013.01); *Y10T 70/5664* (2015.04); *Y10T 70/5681* (2015.04)

(58) Field of Classification Search
CPC .............. B60R 25/021; B60R 25/0211; B60R 25/02113; B60R 25/02115; B60R 25/02118; B60R 25/02128; Y10T 70/5655; Y10T 70/5659; Y10T 70/5681; Y10T 70/5686
(Continued)

(56) References Cited

U.S. PATENT DOCUMENTS

| 8,474,291 | B2 * | 7/2013 | Trischberger | ..... B60R 25/02153 70/186 |
| 2004/0182121 | A1 * | 9/2004 | Fukatsu | ............ B60R 25/02153 70/186 |

(Continued)

FOREIGN PATENT DOCUMENTS

| DE | 19906268 | 9/2000 |
| FR | 2178416 | 11/1973 |

(Continued)

OTHER PUBLICATIONS

International Search Report and Written Opinion from International Application No. PCT/IB2014/064776 mailed Jan. 21, 2015.

*Primary Examiner* — Lloyd Gall
(74) *Attorney, Agent, or Firm* — Dorsey & Whitney LLP

(57) ABSTRACT

In a mechanical steering lock for vehicles, an angular locking nib of a steering shaft is movable away from and towards a releasing position, in which the free rotation of the steering shaft is allowed, and is withheld in this releasing position by two retaining means arranged parallel to each other and one of which comprises a stop element movable away from and towards a retaining position, in which it cooperates abutting against an axial shoulder of the nib.

12 Claims, 4 Drawing Sheets

(58) Field of Classification Search
USPC .......................... 70/182–187, 190, 191, 252
See application file for complete search history.

(56) References Cited

U.S. PATENT DOCUMENTS

2006/0005588 A1* 1/2006 Okuno .............. B60R 25/02153
 70/186
2011/0167885 A1* 7/2011 Sugimoto ............... B60R 25/02
 70/186

FOREIGN PATENT DOCUMENTS

| IT | TO2013A000239 | 3/2013 |
| JP | 2004331020 | 11/2004 |

* cited by examiner

MECHANICAL STEERING LOCK FOR VEHICLES

TECHNICAL FIELD

The present invention relates to a mechanical steering lock for vehicles.

In particular, the present invention relates to a mechanical steering lock of the type comprising a fixed attachment frame, an angular locking nib of a rotating steering shaft of the vehicle coupled to the frame in an axially sliding manner and a cam device for moving the nib between a withdrawn rest position, in which it allows free rotation of the rotating shaft with respect to the frame, and a forward position for retaining or angular locking of the same rotating shaft, again with respect to the frame.

BACKGROUND ART

As soon as the nib reaches its withdrawn rest position, a component of the cam operating device is coupled and withheld by a retaining member of a safety device arranged parallel to the cam operating device so as to maintain the nib in its withdrawn position.

Generally, prior art safety devices comprise a motorized rocker lever, which is generally arranged outside the nib, is provided with a coupling tooth and is pivoted to the frame to rotate with respect thereto between a coupling and retaining position, in which it withholds the component preventing any movement of the nib, and an decoupling or release position, in which it allows the component, and therefore also the nib, to translate towards its forward locking position.

Although prior art steering locks of the type described above are used universally, they are not completely adequate and reliable, as, after long operating times and above all following an accident, the certainty of the nib always being maintained in its withdrawn position and consequently of the shaft being free to rotate can only be achieved by strengthening the parts most susceptible to wear or most at risk of breaking and/or by using high strength materials, such as metals, and therefore with an inevitable increase in weight, overall dimensions and production costs.

DISCLOSURE OF INVENTION

The object of the present invention is to produce a mechanical steering lock for vehicles, which enables the problem indicated above to be solved in a simple and economical manner and, in particular, is efficient, reliable and has limited costs and weights.

According to the present invention there is produced a mechanical steering lock for vehicles; the steering lock comprising an attachment frame, a lock which can be manually actuated by a mechanical key, an elongated angular locking member of a steering shaft coupled to said fixed frame in sliding manner in a rectilinear direction, first actuating means operated by said lock to move the angular locking member between an angular locking position of the steering shaft with respect to the fixed casing, and a releasing position in which the free rotation of the steering shaft with respect to the fixed casing is allowed, and releasable retaining means for withholding said locking member in said releasing position, said releasable retaining means comprise a mobile retaining member with respect to said frame and second actuating means for moving said retaining member away from and towards a retaining position, characterized in that said nib has an axial shoulder essentially orthogonal to said rectilinear direction and in that said retaining member comprises an abutting portion adapted to cooperate directly with said shoulder to stop said nib; said second actuating means comprising a mechanical transmission for connecting to said first actuating means.

Preferably, in the steering lock defined above the retaining member is coupled to a rectilinear guide integral with said fixed frame to translate away from and towards said retaining member in a rectilinear direction orthogonal to said rectilinear direction.

BRIEF DESCRIPTION OF THE DRAWINGS

The invention will now be described with reference to the accompanying drawings, which show a non-limiting example of embodiment thereof, wherein.

BEST MODE FOR CARRYING OUT THE INVENTION

Figure 1:
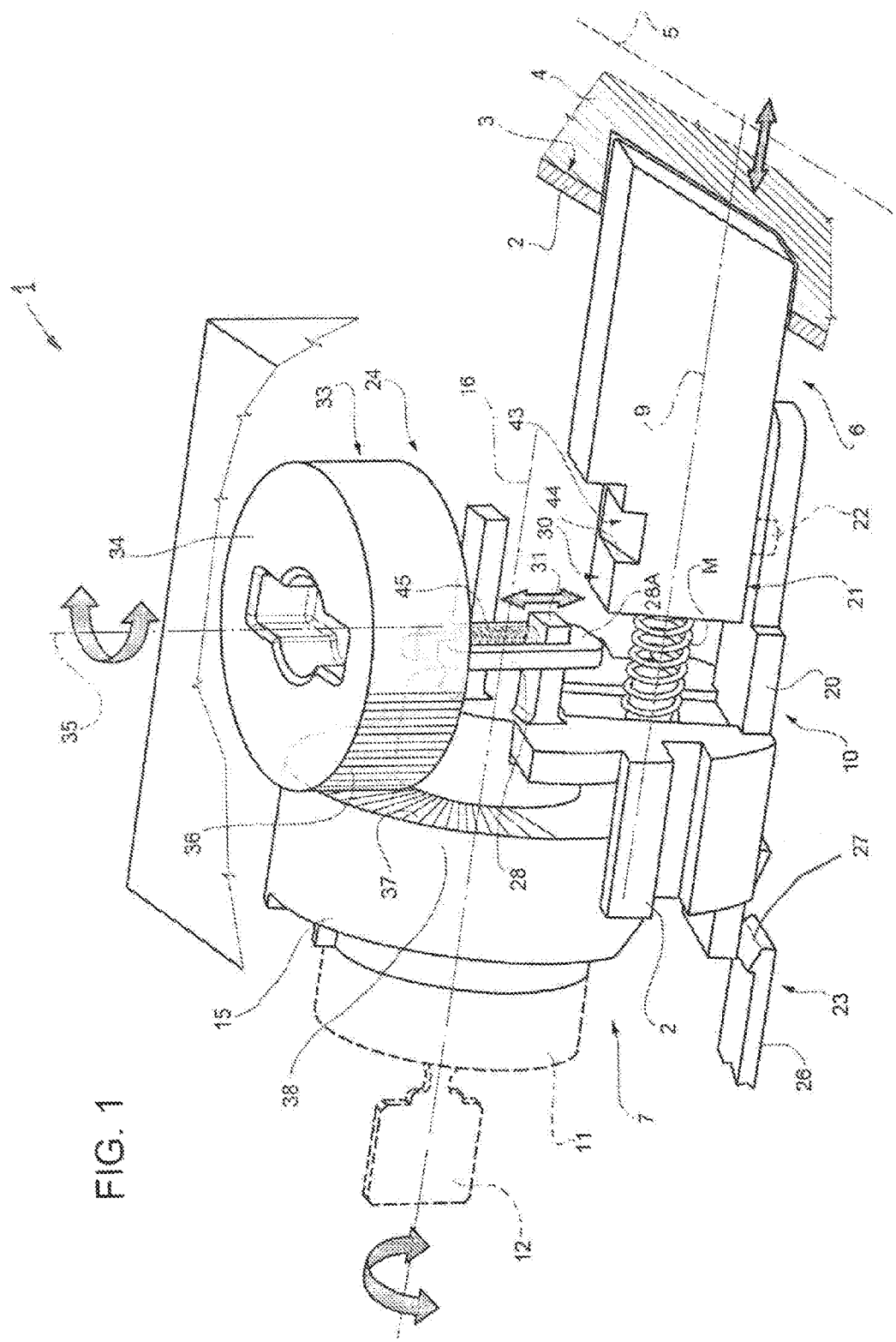
FIG. 1 shows, in a perspective view, a preferred embodiment of the mechanical steering lock for vehicles produced according to the dictates of the present invention.

In the accompanying figures, the number 1 indicates, as a whole, a mechanical steering lock for vehicles. The steering lock 1 comprises a fixed attachment frame 2 defining a cylindrical seat 3 through which a steering shaft 4 of the vehicle passes and rotating about a rotation axis 5.

Figure 2:
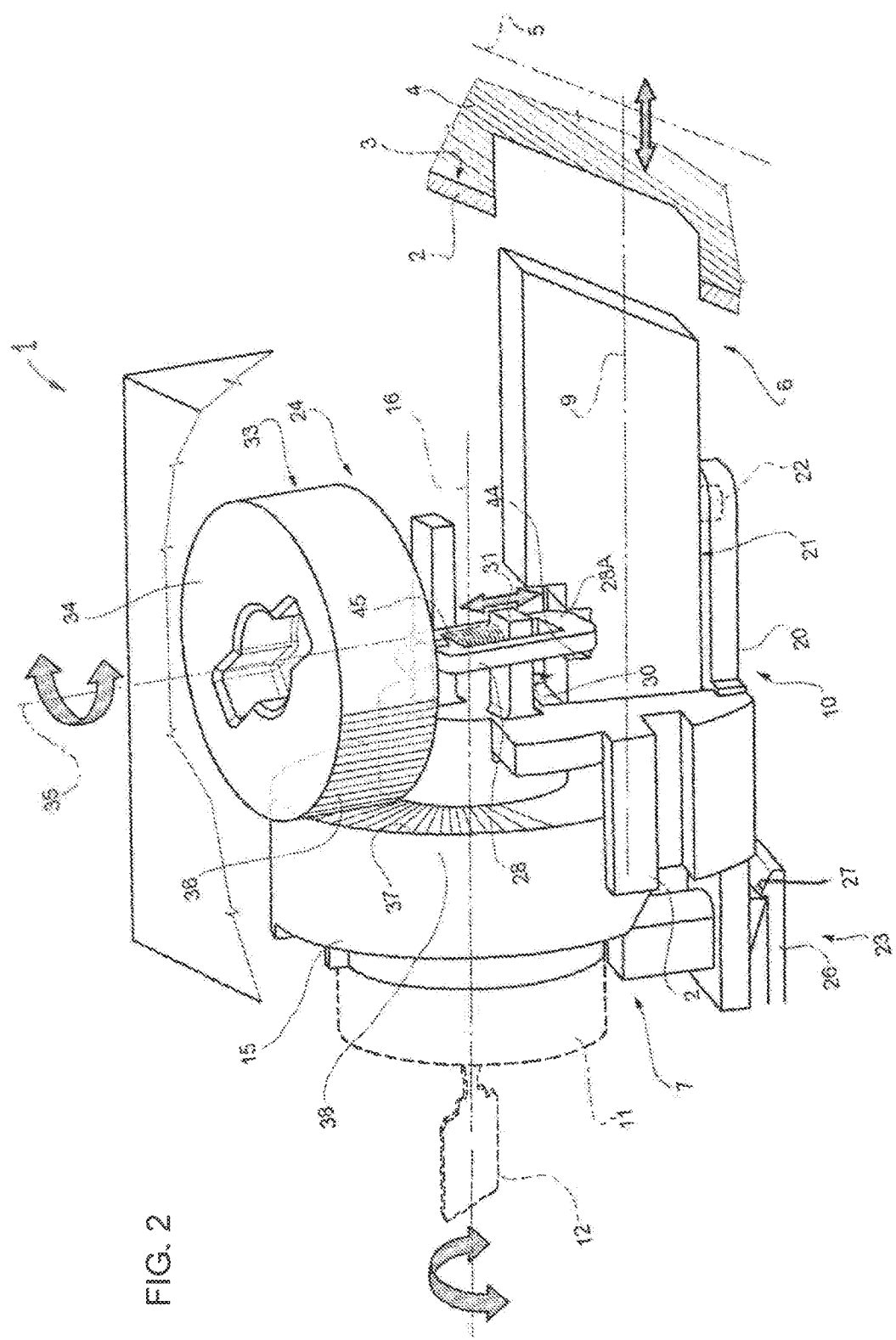
FIGS. 2 and 3 show two different perspective views of the steering lock of FIG. 1 in a different operating condition.

The steering lock 1 also comprises a nib 6 for angularly constraining the shaft 4 inside the cylindrical seat 3 and a mechanical device 7 for moving the nib 6 in a rectilinear direction 9 transverse to the axis 5 between a forward operating position for angular locking of the shaft 4, illustrated in FIG. 1, and a withdrawn rest position, illustrated in FIG. 2.

In the particular example described, the mechanical device 7 comprises a cam and tappet actuating unit 10 and a lock 11, of known type, for operating the actuating unit 10 by means of rotation of a mechanical key 12.

Figure 3:
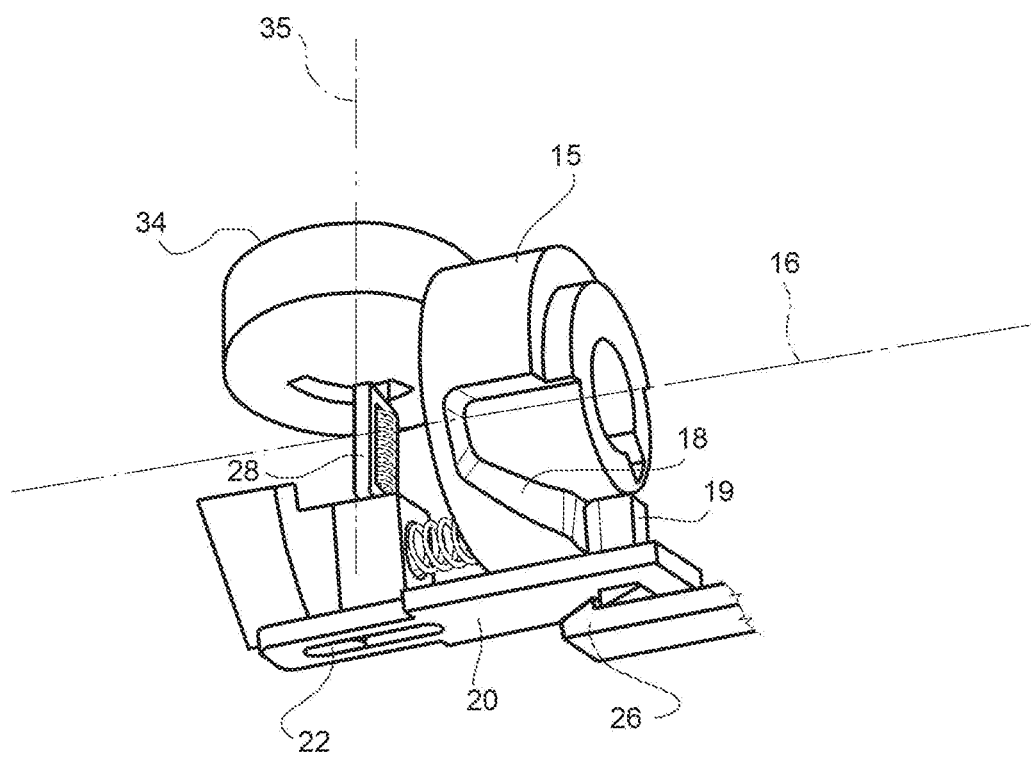

The actuating unit 10 comprises, in turn, a wheel 15 rotational about a fixed axis 16 parallel to the direction 9 and coincident with an axis of the lock 11, and an annular ramped cam (FIG. 3) obtained on a front surface of the wheel 15, facing the lock 11 and a tappet element 19 maintained in contact with the cam by a spring M. The tappet element 19 is stably connected to one end of an operating rod 20, which forms part of the actuating unit 10, is arranged outside the nib 6 and has an opposite end fixed to a lateral surface 21 of the nib 6, preferably by means of a peg 22 orthogonal to the direction 9 and to the same nib.

An intermediate portion of the rod 20 instead passes through a rectilinear guide integrally connected to the frame 2 to translate in opposite directions together with the nib parallel to the direction 9.

Again with reference to the accompanying figures, the steering lock 1 also comprises two retaining devices of the nib 6 in its withdrawn position, indicated with 23 and 24. The devices 23 and 24 are independent from each other.

The device 23, already known and not described in detail, comprises a rocker lever 26 pivoted on the frame 2 in proximity of the wheel 15 and provided with a coupling tooth 27 is adapted to couple with an external boss of the rod 20 opposite the tappet element 19. The rocker lever 26 is thrust towards a release position thereof by a coil spring and towards a coupling position thereof by a boss projecting radially in cantilever fashion from the lock pawl 11 and stably connected to the lock pawl 11 to rotate together therewith.

Figure 4:
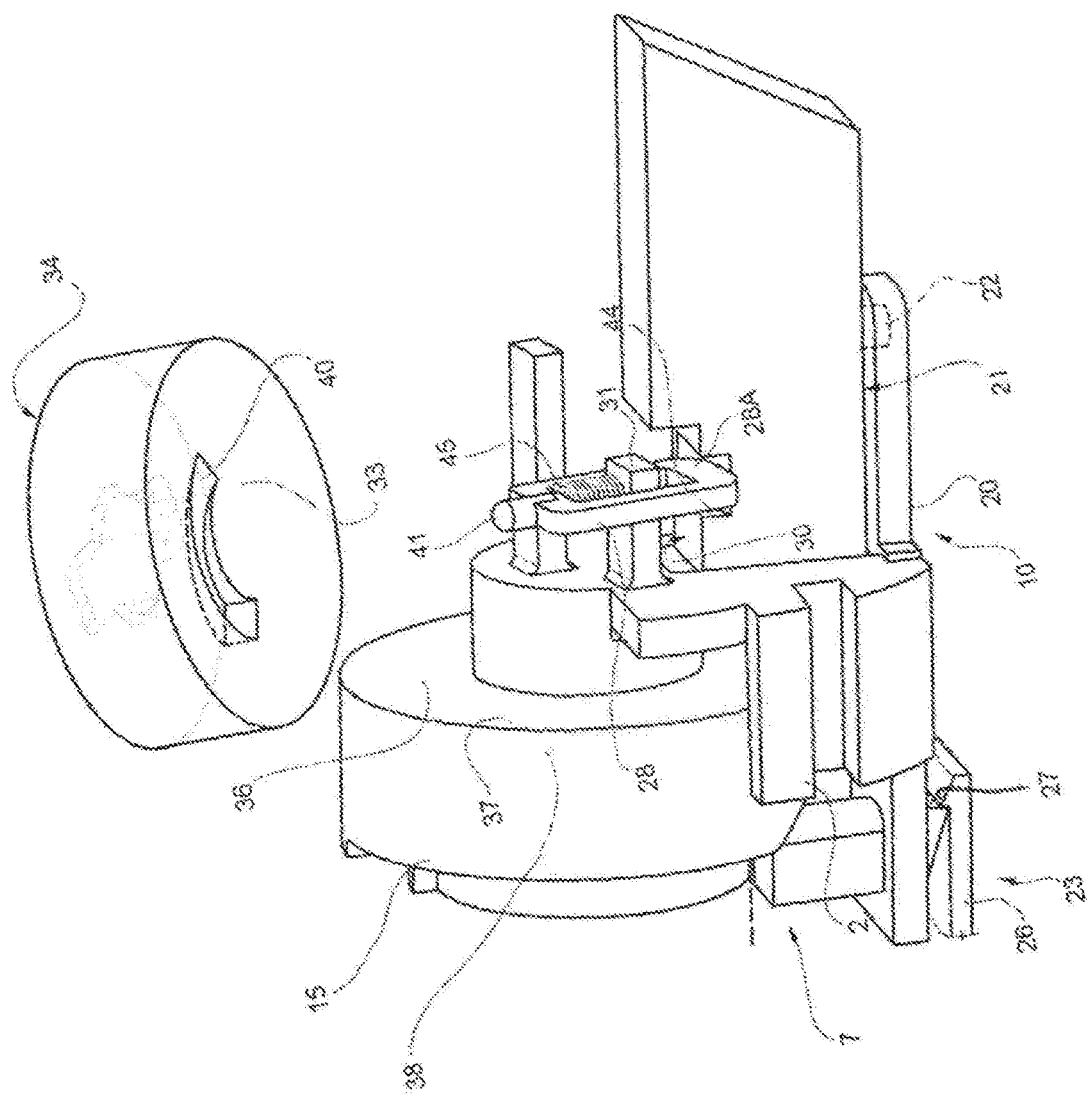
FIG. 4 shows the steering lock of FIGS. 2 and 3 with parts disassembled.

The device 24 is instead arranged between the nib 6 and the wheel 15 and acts directly on the same nib 6. More specifically, the device 24 is operated by the wheel 15 simultaneously to the operation of the nib 6 and comprises a guillotine stop element 28, which is arranged in a position facing the wheel 15 on the opposite part of the same wheel 15 with respect to the lock 11 and to a lateral surface 30 of the nib 6 opposite the surface 21, so that the axis 16 passes through it. The stop element 28 consists of an annular plate-like body orthogonal to the axis 16 and is coupled to a guide 31 integral with the frame 2 to translate in opposite directions orthogonally to the direction 9 and to the axis 16 away from and towards the nib 6 under the thrust of a cam and tappet actuating unit 33 (FIGS. 1 and 4) that forms part of the device 24. In the particular example described, the guide is defined by an appendage that extends inside the annular plate-like body, an inner surface of which slides in contact with the appendage.

Again with reference to FIG. 1, the actuating unit 33 comprises a toothed wheel 34, which is coupled to the frame 2 to rotate in opposite directions about a fixed axis 35 orthogonal to the direction 9 and to the axis 16. The toothed wheel 34 is maintained in a position axially fixed along the axis 35, has an external toothing 36, which meshes with a front toothing 37 opposite the cam 18 of a toothed wheel 38 with front toothing. In the particular example described, the toothed wheel 38 is obtained coaxial to, and in one piece with, the wheel 15. Alternatively, the two wheels 15 and 38 are separate and stably connected to each other.

On the core of the toothed wheel 34 in a position facing the guide 31, the actuating unit 33 also comprises a ramped circular front cam 40 and a tappet element 41 integrally connected to an end portion of the stop element 28, the opposite end portion 28A of which is adapted to be inserted into a slot 43 obtained on the surface 30 of the nib 6 and delimited by a pair of axial shoulders 44 facing each other. The tappet element 41 is thrust against the cam 40 by a return spring 45 interposed between the element 41 and the guide 31 and, in the particular example described, is housed in the annular plate-like body.

Operation of the steering lock 1 will now be described starting from a condition with the steering lock inserted, in which the nib 6 is arranged in its forward position corresponding to a condition of angular locking of the steering shaft 4, the lever 26 is decoupled from the rod 20 and placed in a stand-by condition and the stop element 28 is arranged in a withdrawn position adjacent to the toothed wheel 34 and with the slot 43 disengaged due to the thrust exerted by the spring 45 and to the position of the cam 40.

Starting from this condition, rotation of the lock 11 by means of the key 12 towards a running position causes rotation of the wheel 15, the cam 18 of which simultaneously controls translation of the nib 6 towards its withdrawn position overcoming the action of the spring M and progressive movement of the element 28 towards the nib 6 by means of the actuating unit 24.

As soon as the nib 6 reaches its withdrawn position, the lever 26 couples the boss of the rod 20 withholding the same rod 20 and, indirectly, the nib 6, while the portion 28A of the element 28 engages the slot 43, positioning itself abutting against one of the shoulders 44 directly withholding the nib 6.

From the above it is evident how the presence of two retaining devices of the nib 6 in its withdrawn position makes it possible to always ensure rotation of the steering shaft even in the case of impact or partial breakage of the steering lock 1. In fact, even if the device 23 were damaged or inoperative and/or in a condition with the rod 20 partly or completely snapped, the nib 6 continues to remain in its withdrawn position due to the element 28, which acts directly on the nib 6, i.e. without the interposition of intermediate elements or members as in the case of the device 23. Besides this, the retaining device 24 is practically immune to impacts or external actions as it is arranged in a protected position between the wheels 34 and 38, the frame 2 and the nib 6 that define a protective barrier around the element 28. The particular method of producing of the element 28, its arrangement and the method of coupling to the frame 2 make it possible to considerably limit the overall dimensions above all in the direction 9 and, therefore, to limit the distance from the steering shaft 4. The same result is obtained with the use of the pair of toothed wheels with straight axes and producing the cam 18 toothing 37 assembly practically on opposite surfaces of a single rotating body.

The presence of two retaining devices placed parallel to each other also makes it possible to use materials other than conventional metals and, in particular, plastic materials without strengthening or cores with a noteworthy decrease in weights and costs, and considerable simplification of production.

Experimentally, it was possible to ascertain that satisfactory results in terms of reliability, functional efficiency in the case of impacts and overall dimensions can also be achieved eliminating the device 23 from the steering lock 1 described. Due to the fact that the device 24 acts directly on the nib 6 and is arranged in a position protected from external actions, it alone effectively allows mechanical steering locks of decidedly higher quality than conventional steering locks to be produced.

Moreover, elimination of the device 23 also makes it possible to obtain a noteworthy decrease in the transverse dimensions of the steering lock in the lock area.

Finally, from the above it is evident that modifications and variants can be made to the steering lock 1 described without departing from the protective scope defined by the independent claims. In particular, the mechanical device 7 for moving the nib 6 could differ from the one indicated, as could the device 24, which could comprise a stop element differing from the element of 28 and/or that does not translate but, for example, rotates about a hinge axis or moves along a fixed guide not rectilinear or orthogonal to the direction. Moreover, the actuating unit 33 could differ from the one indicated, where the rotating cam and tappet assembly could be replaced by another equivalent actuating unit, for example of the type with gears, screws or levers.

Finally, in addition to the function described, the toothed wheel 34 could simultaneously perform the function of element for the input or operation of a rotary electric switch associable with the mechanical steering lock 1, for example according to the method described in the Italian patent application TO2013A000239 filed by the same applicant, which is considered an integral part of this application for the necessary parts, with a considerable reduction in overall costs.

The invention claimed is:

1. A mechanical steering lock for vehicles, the mechanical steering lock comprising:
a fixed attachment frame;
a lock which can be manually actuated by a mechanical key;
an elongated locking member of a steering shaft coupled to said fixed attachment frame in a sliding manner in a rectilinear direction;
a first actuating means operated by said lock and including a cam configured to move the elongated locking member between a locking position of the steering shaft with respect to the fixed attachment frame and a releasing position in which free rotation of the steering shaft with respect to the fixed attachment frame is allowed;
a second actuating means comprising a mechanical transmission for connecting to said first actuating means and configured to move a stop element relative to the elongated locking member; and
a releasable retaining means for withholding said elongated locking member in said releasing position, said releasable retaining means comprising the stop element that is movable relative to said fixed attachment frame and said second actuating means away from and towards a retaining position;
wherein said locking member has an axial shoulder essentially orthogonal to said rectilinear direction, and said stop element comprises an abutting portion adapted to cooperate directly with said shoulder to stop said elongated locking member;
wherein said mechanical transmission comprises a gear transmission that includes a first toothed wheel and a second toothed wheel rotational about respective axes substantially orthogonal to each other; and
wherein said first toothed wheel carries the cam and said stop element integrally carries a tappet element cooperating with said rotating cam.

2. The mechanical steering lock according to claim 1, wherein said stop element is coupled to a rectilinear guide integral with said fixed attachment frame to translate away from and towards said locking member in a second rectilinear direction orthogonal to said rectilinear direction.

3. The mechanical steering lock according to claim 2, wherein said stop element includes:
an annular plate-like body and said rectilinear guide extends within said annular plate-like body; and
an elastic return means being accommodated in said annular plate-like body.

4. The mechanical steering lock according to claim 1, wherein said mechanical transmission further comprises another cam configured to move the stop element relative to the elongated locking member.

5. The mechanical steering lock according to claim 4, wherein said another cam is rotatable about an axis, and said another cam is configured to move the stop element in directions substantially parallel to the axis.

6. A mechanical steering lock for vehicles, the mechanical steering lock comprising:
a fixed attachment frame;
a lock which can be manually actuated by a mechanical key;
a first mechanical transmission connected to, and operated by, said lock;
an elongated locking member, which is designed to angularly lock a steering shaft, is coupled to said fixed attachment frame in a sliding manner in a rectilinear direction and is operated by said first mechanical transmission to slide between a locking position, in which the steering shaft is angularly locked with respect to the fixed attachment frame, and a releasing position, in which free rotation of the steering shaft with respect to the fixed attachment frame is allowed; and
a releasable retaining device for withholding said elongated locking member in said releasing position, said releasable retaining device comprising:
a retaining member, movable with respect to said fixed attachment frame, and
a second mechanical transmission connected to, and operated by, said first mechanical transmission for moving said retaining member away from and towards a retaining position;
wherein said elongated locking member has an axial shoulder essentially orthogonal to said rectilinear direction, and said retaining member comprises an abutting portion adapted to cooperate directly with said shoulder to stop said elongated locking member;
wherein said second mechanical transmission comprises a gear transmission and a cam transmission; said gear transmission comprising two toothed wheels, which directly mesh with each other and are rotational about respective axes, orthogonal to each other; and said cam transmission comprising a first rotating cam and a tappet element cooperating with said first rotating cam; and
wherein one of said two toothed wheels carries said first rotating cam, and said retaining member carries said tappet element.

7. The mechanical steering lock according to claim 6, wherein said retaining member is coupled to a rectilinear guide integral with said fixed attachment frame to translate away from and towards said elongated locking member in a second rectilinear direction orthogonal to said rectilinear direction.

8. The mechanical steering lock according to claim 7, wherein said retaining member comprises an annular plate-like body; said rectilinear guide extending within said annular plate-like body; and an elastic return device being accommodated in said annular plate-like body.

9. The mechanical steering lock according to claim 6, wherein said retaining member integrally carries said tappet element.

10. The mechanical steering lock according to claim 6, wherein said first mechanical transmission comprises a second rotating cam, integrally connected to the other one of said two toothed wheels.

11. The mechanical steering lock according to claim 6, wherein said gear transmission comprises only said two toothed wheels.

12. The mechanical steering lock according to claim 6, wherein said retaining member is slidable along a further rectilinear direction, and said first rotating cam is rotatable about a rotation axis that is parallel to said further rectilinear direction.

* * * * *